May 5, 1964     J. P. H. SCHEFFERS     3,132,064
APPARATUS FOR THE EVAPORATION OF LIQUIDS
Filed Oct. 17, 1960
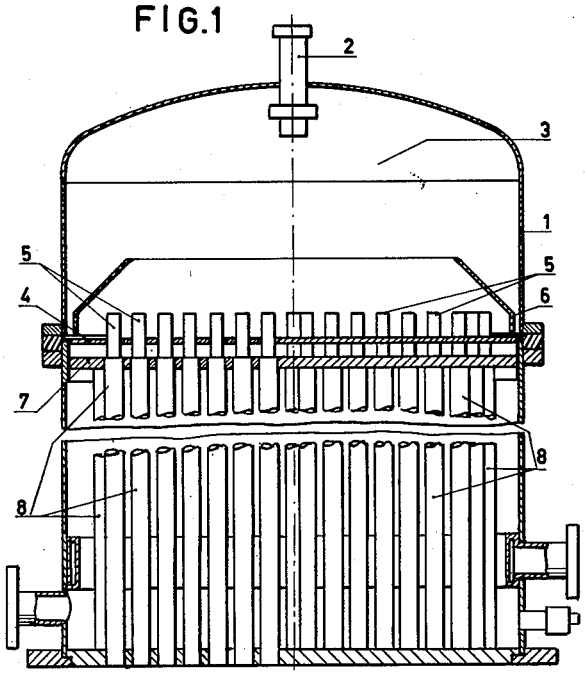
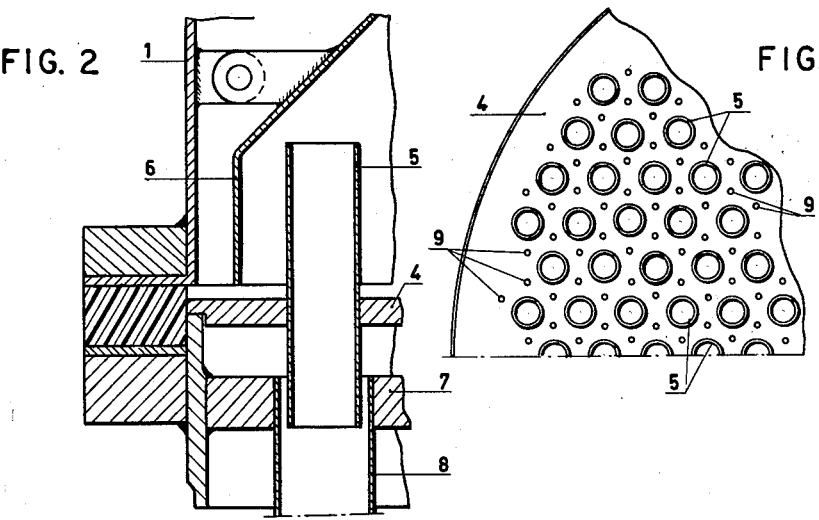
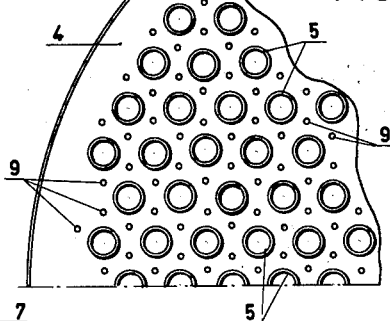
INVENTOR
Johannes Petrus Hendrikus Scheffers
BY *[signature]*
ATTORNEYS

United States Patent Office 3,132,064
Patented May 5, 1964

3,132,064
APPARATUS FOR THE EVAPORATION
OF LIQUIDS
Johannes Petrus Hendrikus Scheffers, 213 Warande,
Schiedam, Netherlands
Filed Oct. 17, 1960, Ser. No. 62,961
Claims priority, application Netherlands Nov. 6, 1959
3 Claims. (Cl. 159—13)

This invention relates to an apparatus for the evaporation of liquids, said apparatus comprising an expansion chamber with an inlet for the liquid to be evaporated and a plurality of tubes arranged between tube sheets, a second set of tubes being provided which partly extend into the expansion chamber and partly down into the upper end of the first-mentioned tubes.

Such an apparatus is known from the U.S.A. patent specification 2,703,610.

In this apparatus the vapour which is formed from the liquid supplied to the expansion chamber flows through the short tubes projecting into the down tubes, and the liquid collects on the tube sheet. This liquid flows along the wall of the down tubes and the level of the liquid on the sheet is determined by an annular gap which is formed between the widened end of the short tubes and the inner wall of the down tubes. The liquid passage is thereby determined by the liquid level on the tube sheet and the dimensions of said gap. This annular gap may differ from tube to tube in view of the tolerances for tube dimensions. Furthermore, soiling easily occurs in the space between the tubes above the gap which in the case of heat-sensitive liquids, such as milk, may give rise to inconvenient decompositions.

This known apparatus does not ensure a uniform distribution over the down tubes of the liquid to be evaporated.

A further disadvantage consists in that each of the short tubes is separately arranged on the tube sheet of the down tube bundle. On the tube sheet there are provided the means for these fastenings which impede the cleaning of the sheet.

The invention provides an apparatus which does not present the above-mentioned disadvantages.

The apparatus according to the invention is characterized in that the second set of tubes is provided in a tube sheet which is arranged at some distance from the upper tube sheet of the first tube bundle and which is provided with orifices between the tubes.

In the first place the application of a tube sheet for the short tubes offers the possibility of these tubes being jointly removed from the apparatus and cleaned.

In the second place an accurate positioning of all short tubes in the down tube is ensured, since the short tubes are not arranged separately anymore, as is done in the known apparatus.

In the case of the apparatus according to the invention the short tubes have no widened ends and the liquid level is not regulated by means of an annular gap forming a narrow passage between the tubes.

The liquid level on the tube sheet of the down tubes is determined in the apparatus according to the invention by the amount of liquid flowing through the orifices in the tube sheet of the short tubes. It is easy to make the diameter of said orifices and the distribution of the orifices of the tube sheet uniform so that a uniform supply to the entire sheet of the down tubes is ensured, once the operation conditions have been set. The tube sheet for the short tubes therefore also serves as a distributor sheet.

The inlet for the liquid to be evaporated may be situated at a level below the upper end of the short tubes. However, it is preferable, and this applies in particular for the device according to the invention, if the inlet is located in the centre of the upper side and that said inlet is shaped like a spray nozzle with orifices directed towards the periphery of the expansion chamber. The liquid then flows along the wall of the expansion chamber to the first tube sheet with the short tubes and the orifices.

As a consequence thereof a steady supply of liquid is obtained from the periphery towards the centre on the sheet.

This can still be improved if according to the invention there is provided a cylinder around the bundle of short tubes and at some distance above the tube sheet, which cylinder by way of supplementary improvement can be surmounted by an inwardly and upwardly projecting frusto-conical flange which extends beyond the outer tubes of the bundle.

The invention is explained below with reference to the accompanying drawings showing by way of example an embodiment of the apparatus according to the invention.

FIG. 1 shows in logitudinal section the upper portion of an evaporation apparatus according to the invention, in which only those parts are shown which are necessary for a good understanding the invention and in which the section of the left hand half of the figure has been taken according to another plane than the section of the righthand half.

FIG. 2 shows likewise in longitudinal section but on an enlarged scale a detail of the apparatus according to FIG. 1.

FIG. 3 shows a top plan view of part of the tube sheet of the short tubes.

In the figures reference numeral 1 denotes the upper portion of an evaporation apparatus, said apparatus comprising an inlet 2 for introducing a liquid of a temperature higher than the temperature maintained in the apparatus into an expansion chamber 3 in which vapour is partly separated. The expansion chamber 3 is closed by a tube sheet 4 in which there are provided a plurality of short tubes 5.

Around the tubes 5 there is provided a cylinder surmounted by an inwardly and upwardly projecting frusto-conical flange 6 which is open at the top and which is detachably secured to the wall of the expansion chamber 3 at some distance from the sheet 4. The way in which the cylinder is secured is shown in FIG. 2 but will not be further discussed here.

The inlet 2 has its interim end closed and is shaped like a spray nozzle of which the orifices are directed laterally toward the wall of the expansion chamber 3 so that the liquid supplied under pressure is sprayed towards the wall and flows down along said wall until it reaches the sheet 4.

The sheet 4 with the tubes 5 is arranged above the upper tube sheet 7 of a bundle of down tubes 8 in which the evaporation takes place. The bundle of down tubes 8 has at its lower end likewise a tube sheet and the bundle is surrounded by a heating medium.

The short tubes 5 project partly into the down tubes 8. The vapour formed in the chamber 3 flows through the tubes 5 into the tubes 8, whereas the liquid on the sheet 4 flows through orifices 9 (see FIG. 3) downwards and arrives on the sheet 7.

From this sheet 7 the liquid flows into the down tubes 8. The film of liquid is entirely determined by the quantity of liquid present on the sheet 4 and the total passage area formed by the orifices 9.

The number of orifices 9, the diameter thereof and the distribution thereof over sheet 4 can be determined for each case on the basis of calculations.

The apparatus according to the invention is particularly suitable for the evaporation of milk, in which evaporation the problem of soiling or incrustation and non-uniform heating in the down tubes are of decisive importance. The apparatus is amongst others also suitable for the evaporation of fruit juices and in all those cases in which down tube evaporators are used.

I claim:

1. A falling film evaporator for the evaporation of liquids comprising a vertical housing having an expansion chamber at its upper end, said expansion chamber having an inlet for the liquid to be evaporated, a pair of horizontal upper and lower tube sheets in the housing, a plurality of open ended vertical tubes arranged between the tube sheets with their ends secured therein, a second set of vertical tubes having open ends, a third horizontal tube sheet carrying said second set of tubes and arranged between the ends of said last mentioned tubes, said tubes of the second set having upper ends partly extending into the expansion chamber and lower ends extending partly down into the upper ends of the first mentioned tubes, said third tube sheet being arranged in spaced relation above the upper tube sheet and being provided with orifices between the tubes of the second set.

2. An apparatus as claimed in claim 1, wherein means is provided for mounting the third tube sheet for ready removal from the housing for cleaning the tubes of the second set.

3. An apparatus as claimed in claim 1, wherein a cylinder is mounted on and spaced from the upper surface of the third tube sheet and is spaced from the wall of the chamber and surrounds the upper ends of the tubes of the second set, said cylinder having an inwardly and upwardly projecting frusto-conical flange.

References Cited in the file of this patent

UNITED STATES PATENTS

| | | |
|---|---|---|
| 491,659 | Lillie | Feb. 14, 1893 |
| 1,013,091 | Kestner | Dec. 26, 1911 |
| 1,323,013 | Christie | Nov. 25, 1919 |
| 1,438,502 | Peebles | Dec. 12, 1922 |
| 2,494,767 | Lindsay | Jan. 17, 1950 |

FOREIGN PATENTS

| | | |
|---|---|---|
| 1,162,894 | France | Sept. 18, 1958 |